United States Patent [19]

Edwards

[11] 4,138,389

[45] Feb. 6, 1979

[54] POLYMERIC ANTIOXIDANTS

[75] Inventor: Douglas C. Edwards, Sarnia, Canada

[73] Assignee: Polysar Limited, Sarnia, Canada

[21] Appl. No.: 491,640

[22] Filed: Jul. 25, 1974

[30] Foreign Application Priority Data

Nov. 8, 1973 [CA] Canada .................................. 185314

[51] Int. Cl.$^2$ ................................................ C08L 9/00
[52] U.S. Cl. .............................. 260/45.7 R; 260/884;
260/894; 526/27; 526/47.6; 526/52.2; 526/52.3;
526/54; 526/56
[58] Field of Search ............ 260/45.7 R, 85.1, 94.7 N,
260/884, 894

[56] References Cited

U.S. PATENT DOCUMENTS

| 2,901,502 | 8/1959 | Young et al. | 260/94.7 N |
|---|---|---|---|
| 3,721,659 | 3/1973 | Cain et al. | 260/85.1 |
| 3,754,056 | 8/1973 | Harpell | 260/94.7 N |
| 3,799,954 | 3/1974 | Cain et al. | 260/85.1 |
| 3,872,057 | 3/1975 | Pazos | 260/85.1 |

FOREIGN PATENT DOCUMENTS 1221595  2/1971  United Kingdom ............... 260/45.7 R

*Primary Examiner*—Ronald W. Griffin
*Attorney, Agent, or Firm*—Stevens, Davis, Miller & Mosher

[57] ABSTRACT

Vulcanizable compositions contain in admixture a synthetic high molecular weight polymer and a compatible low molecular weight polymer containing a multiplicity of antioxidant functional groups chemically bound to the polymer. Vulcanizates derived from these compositions have improved aging characteristics.

9 Claims, No Drawings

POLYMERIC ANTIOXIDANTS

This invention is directed to polymeric compositions which contain low molecular weight polymers having antioxidant functional groups attached thereto and to vulcanizates thereof which have improved aging characteristics.

Natural and synthetic polymers require the presence of a stabilizing material to protect the polymer against excessive breakdown during aging or during heat treatment. Generally the end uses for rubbery polymers require the polymer to have a certain molecular weight range in order to provide the necessary properties in the vulcanizates thereof and in order to retain to a reasonable extent the vulcanizate properties during the use of the vulcanized article. These requirements have been met by the addition to the polymer of suitable chemical compounds which generally act to preferentially react with or decompose free radicals generated in the polymer or in the vulcanizate during the aging process before the free radicals can react with the backbone of the polymer to cause the loss of essential properties. Such chemical compounds are generally known as antioxidants or stabilizers and as antiozonants. Since such chemical compounds are generally low molecular weight additives, low molecular weight in comparison with the high molecular weight of the polymer, and have a high degree of mobility within the polymer or within the vulcanizate, they may be extracted by the action of various fluids and they may be volatilized by the action of heat.

More recently, it has been found that certain antioxidants or antiozonants may be chemically bound to the backbone of rubbery polymers by reaction of suitable compounds with the solid rubber under certain conditions of time and temperature, see for example, British Pat. Nos. 1,185,896 and 1,221,595. In order to achieve the reaction of these compounds with the solid rubber, it is necessary that the compounds contain a chemical group which will react readily with the solid rubber. A deficiency of this prior art is that there are only a limited number of reactive groups which will readily react with the polymers now available under reasonable conditions of time and temperature.

It has now been discovered that polymer systems having good aging characteristics and concurrently significantly reduced volatility or extractability of the stabilizing material may be obtained by mixing with a solid polymer a low molecular weight polymer containing a multiplicity of antioxidant functional groups chemically bound to the low molecular weight polymer, the low molecular weight polymer being compatible with and covulcanizable with said solid polymer.

It is an objective of this invention to provide a vulcanizable polymeric composition comprising a mixture of a low molecular weight polymer containing a multiplicity of antioxidant functional groups chemically bound to the polymer and at least one rubbery copolymer, the mixture being vulcanizable. A further objective of this invention is to provide a process for the preparation of a vulcanizate of improved aging characteristics which comprises preparing a mixture as above and heating it in the presence of vulcanization-active ingredients. Yet a further objective of this invention is to provide an essentially non-volatile stabilizer for synthetic polymers which comprises a polymeric hydrocarbon backbone having attached thereto a multiplicity of antioxidant functional groups.

In accordance with this invention, a low molecular weight polymer is prepared and is then reacted with one or more compounds containing antioxidant functional groups to produce a low molecular weight polymer having chemically bound thereto the antioxidant functional groups. This low molecular weight polymer containing the antioxidant functional groups is mixed with a normally solid polymer and the mixture is vulcanizable to yield shaped articles having improved aging characteristics. The low molecular weight polymer must meet certain criteria to be of use in this invention. The low molecular weight polymer must be so chemically designed as to be compatible with the normally solid polymer with which it is to be mixed. This compatibility of design must be such that the low molecular weight polymer and the normally solid polymer will mix together readily and not separate extensively after mixing. Thus a strongly polar polymer would not normally be mixed with a purely hydrocarbon, non-polar polymer. Further, the compatibility must be such that the presence of the low molecular weight polymer does not seriously affect the vulcanization characteristics or vulcanizate properties of the normally solid polymer. The low molecular weight polymer must be chemically designed so that it will react readily with the compound containing the antioxidant functional group. To achieve this, the low molecular weight polymer must contain a sufficient concentration of at least one chemically active group for reaction with the antioxidant functional group containing compound. The chemical reaction should be designed so that it takes place under relatively mild conditions of time and temperature and does not affect the nature of either the antioxidant functional groups or the polymer itself. The chemical nature of the antioxidant function group may be selected from a wide range and may be varied depending on the requirements for the use of the final vulcanizate. The low molecular weight polymer must be chemically designed so that it will vulcanize in essentially the same manner as does the normally solid polymer with which it is to be mixed. It must thus contain a sufficient number of groups having a reactivity during the vulcanization process which is similar to the chemical reactivity during the vulcanization process of the normally solid polymer.

The low molecular weight polymer of this invention may be selected from polymers of conjugated diolefins such as polybutadiene and polyisoprene, from copolymers of conjugated diolefins such as butadiene-styrene copolymers, from copolymers of conjugated diolefins and olefinically unsaturated nitrile compounds such as butadiene-acrylonitrile copolymers, from copolymers of isoolefins and conjugated diolefins such as isobutylene-isoprene copolymers and halogenated derivatives thereof, and copolymers of ethylene, higher alpha olefins and non-conjugated diolefins such as ethylene-propylene-dicyclopentadiene polymers. The low molecular weight polymer may be further selected from polymers which contain chemically reactive polar groups, such as carboxylic acid, carbonyl, acid aldehyde, epoxy, hydroxy, amine, halogen, or mixtures thereof as may be exemplified by polymers of butadiene-styrene-itaconic acid, butadiene-styrene-glycidyl acrylate, butadiene-styrene-cinnamaldehyde, and butadiene-styrene-dimethyl amino ethyl methacrylate. The low molecular weight polymer may thus contain a reactive functional group selected from carbon-carbon double bonds or a minor proportion of chemically reactive groups such as carboxylic acid, carbonyl, aldehyde, epoxy, hydroxy, amine, halogen or mixtures thereof which may be incorporated by chemical modification of the polymer, these chemically reactive groups then serving as sites at which to attach the antioxidant functional group compound. Examples of suitable monomers for copolymerization include the unsaturated aldehydes, ketones, amines, epoxides, carboxylic acids and unsaturated organic halides. Chemical modification of the polymers may be by an oxidation process, i.e. treatment with ozone, peroxide, etc., an amination process, halogenation, etc.

The low molecular weight polymers of this invention generally have molecular weights in the range of about 1,500 to about 35,000, preferably from about 2,000 to about 20,000. For polymers prepared by an emulsion free radical process, the range of molecular weights may be achieved by means well known in the art such as by using sufficient chain transfer agent such as organic mercaptans during the polymerization. For polymers prepared by the various solution techniques, the molecular weight may be controlled by means well known in that art and including adding hydrogen to the polymerization, changes in monomer or catalyst concentrations or changes in polymerization temperature.

The antioxidant functional groups of the compounds reacted with the low molecular weight polymer of this invention may be selected from a range of chemical functions known in the art to act as antioxidants, including but not limited to amine groups, phenol groups, phosphite groups and mixtures thereof. The antioxidant functional group compound has the form BX, where X is the antioxidant functional group and B is a functional group capable of reacting with the chemically reactive groups of the polymer. Examples of the group X of the compound BX which exhibit a stabilizing effect include the substituted amines such as diphenyl amine, phenylene diamines and phenyl naphthylamine, the hindered phenols such as 2,6-dimethylphenol, and 2,6-di-t-butyl phenol and the hindered bis phenols, and the substituted phosphites such as tri-phenyl phosphite. Mixtures of such groups may also be achieved by using two or more types of compound BX. The exact nature of the group X is not critical providing that it can act as a stabilizer for polymers.

The nature of the group B which may be in the compound BX is of different form depending on the type of reaction necessary to cause the compound to become chemically bound to the polymer. As examples of such groups, but not limiting the scope thereof, may be cited amine groups, carboxyl groups, alkali metal groups, nitroso groups, amide groups, phenol groups, hydroxyl groups, halogens, ketone carbonyl groups, aldehyde groups and mixtures thereof. The essentially nonvolatile stabilizer of this invention is prepared by the reaction of the antioxidant functional group compound with the chemically reactive groups of the low molecular weight polymer and thereby comprises a polymeric hydrocarbon backbone having attached thereto a multiplicity of antioxidant functional groups.

Thus, as specific examples, the low molecular weight polymer may be a halogenated polymer, such as a chlorinated or brominated isobutylene-isoprene copolymer (halobutyl), and the compound BX may be one in which B represents an amine group and X is a stabilizing group as above. Examples of such compounds BX are p-amino-diphenyl-amine and 4-amino-2,6-di-tert-butyl phenol. Alternatively, the low molecular weight polymer may be one containing carboxylic acid groups — COOH such as a butadiene-styrene-itaconic acid copolymer, in which case the compound BX can also be one in which B represents an amine group, as above. When the low molecular weight polymer is one containing amine groups, the compound BX can be one in which B is a chlorine or bromine group and X is a stabilizing group as above. Such a BX compound is 4-chloromethyl-2,6-di-tert-butyl-phenol. When the low molecular weight polymer is one containing hydroxyl groups, the compound BX can be one in which B is an aldehyde group and X is a stabilizing group as above. As a further alternative a low molecular weight polymer containing hydroxyl groups may be treated with phosphorus trichloride and phenol, to put substituted phosphite stabilizing groups on the polymer.

In order to function as an effective stabilizer when mixed with a normally solid polymer, the essentially non-volatile stabilizer should contain a known concentration of antioxidant groups. On dilution of the stabilizer with the normally solid polymer a final concentration of antioxidant groups to be achieved would be in the range of from about 2.5 millimoles per 100 grams of polymer mixture to about 100 millimoles. A preferred concentration of the antioxidant groups in the polymer mixture would be in the range of from 5 millimoles per 100 grams of polymer mixture to 50 millimoles. A more preferred concentration range would be 15 millimoles to 30 millimoles of antioxidant groups per 100 grams of polymer mixture. The actual concentration of antioxidant groups in the polymer mixture is influenced by the use to be made of the vulcanizates derived therefrom and by economic considerations. In order to achieve such concentrations of antioxidant groups in the polymer mixture it is necessary to define the concentration of the antioxidant groups in the essentially non-volatile stabilizer and the amount of said stabilizer mixed with normally solid rubber to yield the polymer mixture. The concentration of the antioxidant groups in said stabilizer is such that they form from about 20 to about 45 weight percent of said stabilizer. The concentration in millimoles depends on the molecular weight of the antioxidant group. For example, for the diphenyl amine group with a molecular weight of 169, said stabilizer would contain from about 120 to about 270 millimoles per 100 grams of stabilizer, corresponding to said range of about 20 to about 45 weight percent. Similarly, for the tri-phenyl phosphite group with a molecular weight of 320, said concentration range would correspond to about 62.5 to about 140 millimoles per 100 grams of stabilizer. The essentially non-volatile stabilizer is mixed with the normally solid rubber in such proportions that it constitutes from about 5 to about 20 weight percent of the mixture and thereby the concentration of antioxidant groups in the mixture can be brought within the range of from about 2.5 to about 100 millimoles per 100 grams of mixture.

By virtue of having established the concentration of antioxidant groups in said stabilizer, the minimum concentration is thereby established for the chemically reactive groups in the low molecular weight polymer. For example, if the low molecular weight polymer contained aldehyde groups as the chemically reactive groups, the concentration of said aldehyde groups must be at least equivalent, on a molar basis, with the concentration of antioxidant groups to be incorporated. The maximum concentration of said aldehyde groups is not critical and will be influenced by other factors such as cost, retention of suitable properties in the low molecular weight polymer, etc. The method whereby said aldehyde groups are reacted with the antioxidant group compound is not critical and will generally be within the scope of known chemical methods. For example, a diamine compound may be reacted with said aldehyde group containing polymer by the action of heat, optionally in a solvent, and the water produced by the reaction of the amine group with the aldehyde group is preferably removed.

The polymeric composition comprises a mixture of at least two compatible polymers, one being a low molecular weight polymer containing a multiplicity of antioxidant functional groups chemically bound to the polymer and the second being at least one rubbery polymer with a molecular weight of at least about 150,000. This latter rubbery polymer is a normally solid polymer. For purposes of ease of handling, the molecular weight of the solid polymer is normally not more than about 500,000. The chemical nature of the normally solid polymer is not critical except that the low molecular weight polymer must be compatible therewith. The normally solid polymer includes blends of two or more polymers. The normally solid polymer may be selected from polymers of conjugated diolefins such as polybutadiene and polyisoprene, from copolymers of conjugated diolefins including, but not limited to, conjugated diolefin-vinyl or vinylidene aromatic compounds, for example, butadiene-styrene copolymers, and conjugated diolefin-olefinically unsaturated nitrile compounds, for example, butadiene-acrylonitrile copolymers, from copolymers of isoolefins and diolefins such as isobutylene-isoprene copolymers and the halogenated derivatives thereof, and from alpha monoolefin copolymers, for example ethylene-propylene-dicyclopentadiene copolymers. In many end uses, butadiene-styrene copolymers and polybutadiene may be blended and such blend is exemplary of the blends which may be mixed with the low molecular weight polymer containing the multiplicity of antioxidant functional groups.

The polymeric composition of this invention is vulcanizable by the action of heat in the presence of vulcanization-active agents. Vulcanization-active agents include those well known in the art including peroxidic compounds, sulphur and sulphur-containing compounds, various phenolic group containing compounds, etc. The vulcanization temperature may be from about 200° F. to about 450° F. and the time necessary at the vulcanization temperature varies generally in inverse proportion to the temperature and may be for from 2 minutes to about 200 minutes.

In a preferred embodiment of this invention, a low molecular weight polymer is prepared to contain a copolymerized monomer having therein a chemically reactive group. An essentially butadiene-acrylonitrile polymer prepared in a solution free radical system may be modified by the inclusion of acrolein in the butadiene and acrylonitrile monomers and the polymerization will proceed in the usual manner yielding a polymer in which the chemically reactive group is aldehyde. The polymerization is conducted in the presence of a sufficient quantity of the free radical initiator such as to yield a polymer having a molecular weight of about 15,000. The polymer may be recovered and re-dissolved in toluene, a calculated quantity of N-phenyl-p-phenylene diamine added and the mixture heated under reflux for about 4 hours, the water formed by the reaction of the amine with the aldehyde being removed. The toluene may then be removed and the essentially non-volatile stabilizer recovered. This stabilizer may be readily mixed with and co-vulcanized with butadiene-acrylonitrile polymers.

The invention is exemplified by the following examples which are not to be construed as limiting the invention.

EXAMPLE 1

848 g. of toluene and 75 g. of azo-bis-isobutyronitrile were charged to a 1-gallon stainless steel reactor equipped with temperature regulating means and stirring means. 474 g. of butadiene and 278 g. of acrylonitrile were then charged, and the temperature was raised to 76° C. This temperature was maintained and the polymerization was allowed to proceed, with continuous stirring, for 10 hours. The polymeric product was separated by addition of methanol, washed repeatedly with methanol and dried. The product was a viscous liquid butadiene-acrylonitrile polymer.

To a stirred suspension of sodium hydride (2 g.) in dry dimethyl formamide (20 ml.) was added dropwise a solution of 4-chloromethyl-2, 6-di-tert-butylphenol (10 g.) in dimethyl formamide (40 ml.) at 25°–30° C. The mixture was stirred for 30 minutes, during which gas evolution ceased, so as to produce a solution of sodium 4-chloromethyl-2, 6-di-tert-butylphenoxide.

To a stirred solution of the liquid butadiene-acrylonitrile polymer (25 g.) in anhydrous tetrafurn (100 ml.), n-butyl lithium (25 ml. of 2 molar hexane solution) was added during 5 minutes, while maintaining the temperature at 30° C. After stirring the viscous mixture for two hours at 25°–30° C., the above solution of sodium 4-chloromethyl-2,6-di-tert-butylphenoxide was added. The mixture was stored overnight at room temperature then poured into saturated sodium chloride solution (200 ml.) containing 100 ml. of 3 N hydrochloric acid, and extracted with ethyl acetate (200 ml.). After a second washing with acidified salt solution, the organic layer was concentrated and the residue triturated with water. The product was redissolved in ethyl acetate and washed with brine. The organic layer was dried to give 24 g. of polymer product. Analysis showed the concentration of the antioxidant functional groups to be approximately 8.5 g. of bound (4-hydroxy-3,5-di-tert-butylphenyl)-methyl groups per 25 g. product or about 140 millimoles of antioxidant functional groups per 100 g. of product. This stabilizer product will be referred to as Antioxidant I.

EXAMPLE 2

25 g. of the liquid butadiene-acrylonitrile copolymer described in Example 1 was dissolved in methylene chloride (100 ml.). To the stirred, cooled (−40° C.) solution was added liquid nitrosyl chloride (3.3 g.). The mixture was allowed to warm up to 10°–15° C. (30 min.). Vacuum was applied for 30 min. to remove any unreacted nitrosyl chloride.

The insoluble residue was diluted with methylene chloride (100 ml.). To this was added a solution of 6 g. triethylamine and 0.05 mole of p-amino-diphenylamine in 25 ml. of methylene chloride over a period of 5 minutes. The mixture was stirred for one hour, then allowed to stand overnight; it was now a homogeneous liquid. After 30 minutes further stirring, the solution was diluted with methylene chloride (200 ml) and washed with 1.5 N hydrochloric acid (100 ml.) and sodium bicarbonate solution (100 ml.). The organic layer was dried. Analysis showed the product to contain approximately 8 g of bound [4-(phenylamino)-phenyl]-amino groups per 25 g. of product. This product will be referred to as Antioxidant II.

The same procedure as above was repeated except that in place of 0.05 mole of p-amino-diphenylamine, a mixture of 0.025 mole of p-amino-diphenylamine and 0.025 mole of 4-amino-2,6-di-tert-butyl phenol was employed. The resultant product was shown by analysis to contain approximately 3.75 g. of bound [4-(phenylamino)-phenyl]-amino groups and 4.75 g. of bound (4-hydroxy-3,5-di-tert-butyl phenyl)-methyl groups per 25 g. product. This product will be referred to as Antioxidant III.

EXAMPLE 3

The antioxidants described in Examples 1 and 2 were evaluated in the following compounds, all quantities being expressed in parts by weight:

| Experiment # | (1) | (2) | (3) | (4) | (5) |
|---|---|---|---|---|---|
| POLYSAR KRYNAC 34-60 SP[1] | 100 | 100 | 100 | 100 | 100 |
| ZMBI[2] | — | 2 | — | — | — |
| Betanox Special[3] | — | 2 | — | — | — |
| Antioxidant I | — | — | 9.7 | — | — |
| Antioxidant II | — | — | — | 8.6 | — |
| Antioxidant III | — | — | — | — | 10 |
| Di Cup 40C[4] | 5 | 5 | 5 | 5 | 5 |

Notes:
[1]KRYNAC 34-60 SP is a copolymer of butadiene and acrylonitrile supplied by Polysar Limited. KRYNAC is a Trade Mark.
[2]ZMBI is the zinc salt of 2-mercapto benzimidazole.
[3]Betanox Special is an amine-acetone reaction product supplied by Uniroyal Limited.
[4]Di Cup 40 C is a mixture of 40 parts dicumyl peroxide with 60 parts of calcium carbonate, supplied by Hercules, Inc.

Experiment (1) represents a compound unprotected against oxidation. Experiment (2) represents a compound protected with a high performance conventional antioxidant system. Experiments (3), (4) and (5) contain antioxidants of the present invention, each at a loading such as to contain about 15 millimoles of antioxidant functional groups per 100 g. rubber.

The compounds were mixed on a 2-roll laboratory micro mill, using 5 g. of rubber in each case, the quantities of other ingredients being reduced proportionately. Samples of the compounds were cured in a laboratory press for 160 min. at 150° C., providing sheets 2¼" × 2¼" × 0.03". From each of these sheets, a specimen 1" × 2" was cut. Each specimen was placed in an individual glass tube and completely immersed by the addition of 100 ml. of ASTM Oil #3. The tubes were then placed in an oven at 150° C. so as to allow for possible extraction of the antioxidants. After cooling, the sheets were blotted dry and placed in individual jars with 100 ml. of pentane, so as to extract the absorbed oil. After 24 hr. the pentane was removed, 100 ml. fresh pentane was added and the extraction allowed to continue for a second 24 hr. period. The specimens were then removed and dried under vacuum.

Each specimen was then cut into several strips 1" × ¼" × 0.03" in size. These strips were placed in small individual screw-cap glass vials filled with oxygen. The vials were placed in an oven at 150° C. Individual specimens were removed at convenient intervals so as to observe the course of the oxidative deterioration. Oxygen was replenished at intervals not greater than 24 hours.

The specimen of experiment (1), containing no antioxidant in the compound recipe, was embrittled after 32 hr. in oxygen, such that it could not be bent double without surface fracture. The specimen of experiment (2), containing the conventional high quality protective system, was flexible after 32 hours but embrittled after 48 hours' aging. The remaining three compounds, containing stabilizers representative of this invention, were flexible after 48 hours. This illustrates the superior protective action of these stabilizers under conditions of sequential exposure to oil and oxygen at 150° C.

EXAMPLE 4

Into a 30 oz. capped polymerization bottle were charged 393 g. of 1,1,2 trichloroethane, 13.5 g. azobisisobutyronitrile, 22.5 g. acrolein, 48 g. acrylonitrile and 120 g. butadiene. The bottle was installed in a metal shield and placed under tumbling agitation in a polymerizer for 10 hr. at 76° C. Five such polymerizations were conducted side by side. Conversion to polymer was 85%. The polymer solutions were filtered through cloth into a single vessel and mixed. The product was recovered by evaporation of the solvent under vacuum at 100° C.

The product was a straw-coloured viscous liquid. Analysis showed the product to be a terpolymer of butadiene, acrylonitrile and acrolein containing about 8 weight percent of acrolein groups.

10 g. of this product was weighed onto a watch glass. To this was added 2.58 gm. of p-amino-diphenyl amine. The mixture was heated over a beaker of boiling water for 30 minutes with occasional mixing. The violet colour of the amine disappeared, and a dark amber highly viscous liquid product was obtained. This will be referred to as Antioxidant IV.

This product was compounded and tested side by side with those described in Example 3, using the identical procedures. The compound recipe was as follows:

| | |
|---|---|
| POLYSAR KRYNAC 34-60 SP | 100 |
| Antioxidant IV | 13.5 |
| Di Cup 40 C | 5 |
| Press Cure: 160 min. at 150° C | |

In the sequential oil-oxygen aging test, as described in Example 3, the vulcanizate was observed to retain flexibility for more than 48 hours in oxygen at 150° C.

EXAMPLE 5

200 g. of the liquid butadiene/acrylonitrile/acrolein terpolymer of Example 4 was dissolved in 300 ml. toluene. 64 g. of p-amino-diphenylamine was added and the solution was refluxed for four hours. The water produced from the condensation of the amine and aldehyde was collected in a DeanStark trap, 92% conversion being indicated. Toluene was removed by distillation followed by evacuation. Some gelation had occurred and the product was redissolved in benzene, filtered through cloth and dried under vacuum at 90° C. The product was a dark amber liquid having a viscosity of 4900 poise at room temperature. This will be referred to as Antioxidant V.

Compounds containing 150 g. rubber were prepared on a laboratory mill according to the following formulations:

|  | (1) | (2) | (3) |
|---|---|---|---|
| POLYSAR KRYNAC 34-60 SP | 100 | 100 | 100 |
| MT Carbon Black | 75 | 75 | 75 |
| FEF Carbon Black | 25 | 25 | 25 |
| Paraplex G-50[1] | 10 | 10 | — |
| ZMBI | 2 | 2 | 2.8 |
| Betanox Special | 2 | — | — |
| Age Rite White[2] | — | 2 | — |
| Antioxidant V | — | — | 11.4 |
| Di Cup 40 C | 5 | 5 | 5 |

Notes:
[1] Paraplex G-50 is a plasticizer supplied by Rohm and Haas Co.
[2] Age Rite White is an amine antioxidant supplied by R. T. Vanderbilt Co.

Compounds (1) and (2) represent conventional recipes containing high-performance antioxidant systems.

Sheets 6" × 6" × .03" were press cured for 40 min. at 160° C. From these sheets, micro dumbbell specimens were cut. The specimens were immersed is ASTM Oil #3 for 24 hr. at 150° C. then blotted dry and aged in air for 70 hours at 150° C. The following data were obtained:

| Vulcanizates from compound # | (1) | (2) | (3) |
|---|---|---|---|
| Original Stress-Strain Properties: | | | |
| Tensile Strength (kg/cm$^2$) | 180 | 175 | 180 |
| Elongation at Break (%) | 190 | 235 | 230 |
| Stress-Strain Properties after Sequential Oil-Air Aging: | | | |
| Tensile Strength (kg/cm$^2$) | 65 | 90 | 155 |
| Elongation at Break (%) | <50 | <50 | 70 |

These data illustrate the superior retention of physical properties imparted by the stabilizer within the scope of the present invention.

EXAMPLE 6

30 oz. capped polymerization bottles were charged as follows, all quantities in grams:

|  | (a) | (b) | (c) | (d) |
|---|---|---|---|---|
| 1,1,2 Trichloroethane | 393 | 393 | 393 | 393 |

|  | (a) | (b) | (c) | (d) |
|---|---|---|---|---|
| Azo-bis-isobutyronitrile | 13.5 | 13.5 | 13.5 | 13.5 |
| Acrolein | 38 | 38 | 22.5 | 22.5 |
| Acrylonitrile | — | 38 | 65 | 48 |
| Butadiene | 152.5 | 114 | 103 | 120 |

The bottles were heated in a polymerizer, as in Example 4, for 10 hours at 76° C. The polymeric products were recovered by removal of the solvent under vacuum at 100° C., and were stabilized by the addition of 1 part of 2,2'-methylene-bis-(4-methyl-6-nonyl phenol) per 100 parts polymer. The polymers were liquids having viscosities (poise) as follows:

| (a) | (b) | (c) | (d) |
|---|---|---|---|
| 40 | 1300 | 7800 | 1560 |

A 100 g. quantity of each polymer was dissolved in 200 ml. toluene. p-Amino diphenylamine was added to each, 64 g. to (a) and (b), and 39 g. to (c) and (d). The solutions were refluxed for 4 hours, water generated being collected in a Dean-Stark trap. The products were recovered by vacuum drying at 100° C. All of the stabilizer products were viscous liquids. They will be referred to as Antioxidants VI, VII, VIII and IX respectively. They had number average molecular weights of 2900, 4400, 2700 and 2500 respectively.

Compounds were prepared on a micro mill using 7 g. of rubber, according to the following recipes, parts being by weight:

|  | (1) | (2) | (3) | (4) | (5) | (6) | (7) | (8) | (9) |
|---|---|---|---|---|---|---|---|---|---|
| POLYSAR KRYNAC 34-60 SP | 100 | 100 | 100 | 100 | 100 | 100 | 100 | 100 | 100 |
| MT Carbon Black | 75 | 75 | 75 | 75 | 75 | 75 | 75 | 75 | 75 |
| FEF Carbon Black | 25 | 25 | 25 | 25 | 25 | 25 | 25 | 25 | 25 |
| Betanox Special | 2 | — | — | — | — | — | — | — | — |
| ZMBI | 2 | 2 | 2 | 2 | 2 | 2 | 2 | 2 | 2 |
| Antioxidant VI | — | 10 | 15 | — | — | — | — | — | — |
| Antioxidant VII | — | — | — | 10 | 15 | — | — | — | — |
| Antioxidant VIII | — | — | — | — | — | 10 | 15 | — | — |
| Antioxidant IV | — | — | — | — | — | — | — | 10 | 15 |
| Di Cup 40 C | 5 | 5 | 5 | 5 | 5 | 5 | 5 | 5 | 5 |

Press Cure: 40 min. at 160° C

Press Cure: 40 min. at 160° C. Specimens 1" × 2" × 0.03" of each vulcanizate were placed in individual tubes and immersed in ASTM Oil #3. The tubes were placed in an oven for 24 hr. at 150° C. The specimens were then blotted dry and suspended in a circulating air oven for 48 hours at 150° C.

Stress-strain properties of aged and unaged vulcanizates specimens were determined, with the following results:

| # | (1) | (2) | (3) | (4) | (5) | (6) | (7) | (8) | (9) |
|---|---|---|---|---|---|---|---|---|---|
| Stress-Strain Properties (Unaged) | | | | | | | | | |
| Tensile Strength (kg/cm$^2$) | 142 | 146 | 130 | 161 | 140 | 150 | 130 | 162 | 134 |
| Elongation % | 180 | 370 | 480 | 360 | 450 | 370 | 420 | 320 | 410 |
| 100% Modulus (kg/cm$^2$) | 82 | 34 | 22 | 39 | 34 | 40 | 31 | 36 | 28 |
| Stress-Strain Properties after Sequential Oil-Air Aging: | | | | | | | | | |
| Tensile Strength (kg/cm$^2$) | 52 | 165 | 164 | 177 | 155 | 157 | 172 | 156 | 151 |
| Elongation % | 10 | 100 | 100 | 100 | 90 | 100 | 100 | 80 | 90 |
| 100% Modulus | | | | | | | | | |

-continued

| # | (1) | (2) | (3) | (4) | (5) | (6) | (7) | (8) | (9) |
|---|-----|-----|-----|-----|-----|-----|-----|-----|-----|
| (kg/cm²) | — | 165 | 164 | 177 | — | 157 | 172 | — | — |

The data show that all of the vulcanizates containing stabilizers within the scope of this invention had superior retention of elastic properties following successive exposure to oil and hot air.

What is claimed is:

1. A vulcanizable polymeric composition comprising a mixture of at least two compatible polymers, a first polymer being a conjugated diolefin polymer of molecular weight from about 1,500 to about 35,000 and being the reaction product of a reactive polymer containing chemically bound to the polymer a multiplicity of chemically reactive groups selected from olefinic carbon-carbon double bonds, aldehyde, carboxyl, hydroxy, halogen and mixtures thereof, with one or more antioxidant functional group containing compounds of form BX, where B is a functional group selected from amine, alkali metal, hydroxyl, aldehyde and mixtures thereof and capable of reacting with said chemically reactive groups, and X is an antioxidant functional group selected from diphenylamines, phenylene diamines, phenyl naphthylamines, hindered phenols and triphenyl phosphite, said antioxidant functional groups forming from about 20 to about 45 weight percent of said first polymer and said first polymer forming from about 5 to about 20 weight percent based on polymeric components of said mixture, the second polymer being at least one rubbery polymer having a molecular weight of about 150,000 to about 500,000 and being selected from polymers of conjugated diolefins, copolymers of conjugated diolefins with vinyl or vinylidene aromatic compounds, copolymers of conjugated diolefins and olefinically unsaturated nitrile compounds, copolymers of isoolefins and diolefins, alpha-mono-olefin copolymers or blends thereof, said first polymer being vulcanizable with said second polymer.

2. The composition of claim 1 wherein said first polymer has a molecular weight of about 2,000 to about 20,000.

3. The composition of claim 1 wherein said chemically reactive groups are aldehyde.

4. The composition of claim 3 wherein the functional group B is an amine group.

5. The composition of claim 4 in which the compound BX is p-amino-diphenyl-amine.

6. The composition of claim 1 wherein said second polymer is selected from butadiene-styrene polymers, butadieneacrylonitrile polymers, isoprene-acrylonitrile polymers, butadiene polymers, isoprene polymers, isobutylene-isoprene polymers and ethylene-propylene-non-conjugated diene polymers.

7. A process of preparing a vulcanized composition having improved aging characteristics which comprises mixing a first polymer with at least one second polymer and heating the mixture in the presence of vulcanization-active agents for the mixture, said first polymer being a conjugated diolefin polymer of molecular weight from about 1,500 to about 35,000 and being the reaction product of a reactive polymer containing chemically bound to the polymer a multiplicity of chemically reactive groups selected from olefinic carbon-carbon double bonds, aldehyde, carboxyl, hydroxy, halogen and mixtures thereof, with one or more antioxidant functional group containing compounds of form BX, where B is a functional group selected from amine, alkali metal, hydroxyl, aldehyde and mixtures thereof and capable of reacting with said chemically reactive groups and X is an antioxidant functional group selected from diphenylamines, phenylene diamines, phenyl naphthylamines, hindered phenols and triphenyl phosphite, said antioxidant functional groups forming from about 20 to about 45 weight percent of said first polymer, said first polymer being covulcanizable with said second polymer, the second polymer being a rubbery polymer having a molecular weight of about 150,000 to about 500,000 and being compatible with said first polymer, said second polymer being selected from polymers of conjugated diolefins, copolymers of conjugated diolefins with vinyl or vinylidene aromatic compounds, copolymers of conjugated diolefins with olefinically unsaturated nitrile compounds, copolymers of isoolefins and diolefins, alpha-mono-olefin copolymers or blends thereof, said first polymer forming from about 5 to about 20 weight percent based on polymeric compounds of said mixture.

8. The process of claim 7 in which the mixture is heated for from 2 minutes to about 200 minutes at a temperature of from about 200° F. to about 450° F.

9. The process of claim 7 wherein said first and second polymers are mixed prior to the incorporation of the vulcanization-active agents.

* * * * *